United States Patent [19]
Tricon

[11] 3,985,027
[45] Oct. 12, 1976

[54] CONTROLLED FLOW IMPEDANCE IN A PRESSURE SENSING SYSTEM

[75] Inventor: Alfred J. Tricon, Houston, Tex.

[73] Assignee: Sperry-Sun, Inc., Houston, Tex.

[22] Filed: July 10, 1975

[21] Appl. No.: 594,912

Related U.S. Application Data

[63] Continuation-in-part of Ser. No. 499,703, Aug. 22, 1974, abandoned.

[52] U.S. Cl. ............................................. 73/151
[51] Int. Cl.² ........................................ E21B 47/06
[58] Field of Search ................... 73/302, 155, 151

[56] References Cited
UNITED STATES PATENTS

| | | | |
|---|---|---|---|
| 3,572,121 | 3/1971 | Kessera et al. ........................ | 73/302 |
| 3,620,085 | 11/1971 | Khoi ........................................ | 73/302 X |
| 3,712,129 | 1/1973 | Rhoades ................................ | 73/151 |
| 3,874,231 | 4/1975 | Walther, Jr. ............................ | 73/151 |

*Primary Examiner*—Jerry W. Myracle
*Attorney, Agent, or Firm*—Macka L. Murrah

[57] ABSTRACT

An unknown pressure at a remote location, such as in a borehole, is sensed by passing a fluid at a constantly increasing pressure, into a pressure sensitive device at the remote location. The pressure is monitored at the measurement location until a characteristic change in the rate of pressure buildup in the pressure sensitive device occurs. Effects of fluid supply pressure on the monitoring device are minimized in relation to buildup pressure in the pressure sensitive device by placing a flow control valve between the supply pressure source and the buildup pressure monitor.

8 Claims, 4 Drawing Figures

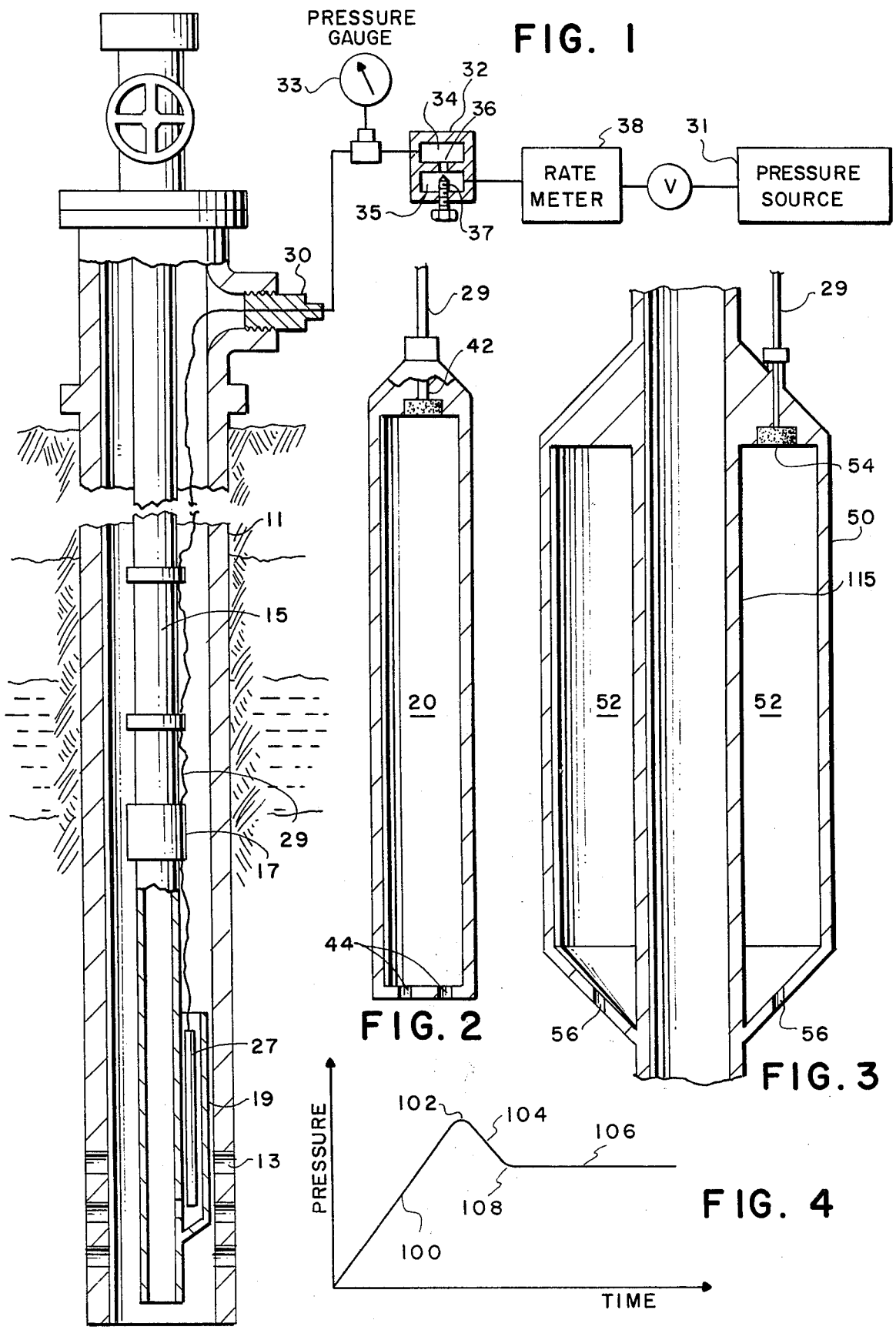

CONTROLLED FLOW IMPEDANCE IN A PRESSURE SENSING SYSTEM

BACKGROUND OF THE INVENTION

This is a continuation-in-part of application Ser. No. 499,703, filed Aug. 22, 1974, now abandoned.

The invention relates to the measurement of fluid pressure at a remote location and is of particular application to measurement of pressures in a borehole.

Pressures of fluid in boreholes are particularly important in production of oil and gas. Secondary recovery operations, for example, require pressure information to determine a number of factors necessary to success of the operations.

Preliminary to secondary recovery operations borehole pressures give an indication of well productivity potential and the amount of fluid that will be required to "fill up" the space in the formation before oil and gas begin to be forced out. During operations the measurement of pressure changes in a number of boreholes in a formation indicate the location of injection fluid fronts as well as the efficiency with which the flood front is sweeping through the formation.

In addition to secondary recovery operations, borehole pressures are important in other areas of oil and gas production. For example, pressure measurements may be used to indicate wellbore damage or any number of other problems in pumping wells.

Bottom hole pressure data may be provided either on a permanent basis or may be determined over short periods of time by periodically inserting pressure instruments into the borehole. Many times it is inconvenient and very expensive to take such data on a periodic basis, since the well must normally be shut in or producing equipment removed to facilitate insertion of the pressure sensing instrumentation. In order to overcome these problems permanent pressure measuring devices have been devised for installation in wells. Examples of such device are disclosed in U.S. Pat. application by B. W. McArthur having Ser. Nos. 414,060, now U.S. Pat. No. 3,895,527, 414,062, now U.S. Pat. No. 3,898,877 and 467,349, now abandoned.

The McArthur devices use a local pressure source to pump a fluid at a known pressure and rate into a pressure sensitive device in the borehole when the unknown pressure is to be measured. The pressure at which the fluid is supplied to the borehole device is increased while being monitored at the surface until equalization between the unknown pressure and the pressure in the device causes a characteristic change in the rate of pressure buildup.

An important objective in such a pressure measuring scheme is thus to monitor the rate of pressure buildup in the downhole pressure sensitive device. The presence of the supply pressure source at the surface, being much nearer to the pressure monitoring device than to the downhole device, presents a problem in monitoring the pressure. The pressure monitoring device tends to reflect the pressure emanating from the fluid source more than the unknown downhole pressure, an effect caused by the small size and great length of the tubing that communicates between the surface and the downhole device. Due to these factors, pressure changes in the downhole device are transmitted to the surface pressure monitoring device more slowly than may be desired, while changes due to the much nearer fluid pump, are communicated to the monitoring device more quickly. In terms of flow resistance, the impedance between the downhole device and the pressure monitoring device is much greater than the impedance between the pressure source and the pressure monitoring device.

SUMMARY OF THE INVENTION

The invention contemplates a new and improved pressure measuring apparatus in which a fluid is passed into a pressure sensitive device at a remote location, at a constantly increasing pressure and monitored until a characteristic change in the rate of pressure buildup in the pressure sensitive device occurs. A flow control valve is placed between the source of the fluid and the pressure monitor to isolate supply pressure from the unknown pressure.

BRIEF DESCRIPTION OF THE DRAWINGS

The invention may be more fully understood by considering the exemplary embodiments illustrated in the following drawings:

FIG. 1 shows the invention embodied in a downhole pressure measuring system;

FIG. 2 shows a downhole probe with which the invention may be used;

FIG. 3 shows an alternative embodiment of the downhole probe; and

FIG. 4 is a graphical representation of how indications of pressure changes measured at the surface may be used to determine downhole pressure parameters.

DETAILED DESCRIPTION OF THE INVENTION

The use of the invention in connection with a borehole is shown in FIG. 1 in which a wellbore is shown extending into underground formations. Production equipment for producing fluids from the formation is shown schematically and includes a casing 11 in the wellbore, having perforations 13 at its lowr end to permit entry of formation fluid. A tubing string 15 extends from a wellhead at the surface downwardly within the borehole to the lower end thereof. Spacers 17 are provided in the tubing string to maintain the tubing centered in the borehole. A mandrel 19 is shown attached to the lower end of the tubing to provide a seat for a downhole pressure probe 27. Downhole pressure measuring probe 27 is shown positioned in the mandrel at the lower end of the tubing. The small diameter hollow tube, or conduit 29, extends from within the pressure measuring probe. Tube 29 as used in the present system is typically 0.026 inches and 0.054 inches. Tubing in this range is known in the art as microtubing. The tube is positioned on the outside of the tubing string and extends to the surface where it exits on the side of the wellhead through a fitting 30. This tube is generally the depth of the borehole, which can exceed 10,000 feet. Connected to tube 29 at the surface is a fluid pressure source 31, which may be a bottle of pressurized gas, a pump, or the like, and a pressure indicating device 33. A rate meter 38 is shown in the system to measure the rate of pressure change when pressure is applied to the system. The rate may be determined by any sort of device that measures pressure as a function of time. Thus, as pressure is charted versus time or printed out in a timed sequence, this will serve to establish a rate of pressure change.

Connected between pressure gauge 33 and rate meter 38 is a flow control device 32. Although the flow control device can be of any design, the particular device shown is of the needle valve variety. As schematically represented in FIG. 1, it has an upper chamber 34 and a lower chamber 35 that have an orifice 36 between them. A needle 57 screws into lower chamber 35 and fits into orifice 36. The size of orifice 36 is thus controlled by the extent to which needle 57 is screwed into it.

For purposes of the present system, valve 32 must be of the micro flow rate variety. A typical valve for use herein is the "Micro Control" metering valve manufactured by High Pressure Equipment Company of Erie, Pennsylvania and having a full-open flow coefficient of 0.04.

The particular embodiment of the downhole probe 27 is shown in more detail in FIG. 2. Probe 27 is an enclosed chamber having two ports through which fluid can communicate with its interior. At the upper end tubing 29 provides communication between the probe chamber and the surface. A filter 42 that may be made of a porous metallic material prevents foreign material from communicating between the probe 27 and tube 29. At the bottom of probe ports 44 allow borehole fluid to enter and exit the probe chamber.

An alternative embodiment of the downhole probe is shown in FIG. 3. A cylindrical shell 50 is disposed concentrically about tubing string 115 and attach thereto at its top and bottom to form an enclosed chamber 52 between the cylindrical shell 50 and the tubing string 115. Chamber 52 communicates with the surface at its upper end through porous filter 54 and tubing 29. Borehole fluids communicate with chamber 52 by means of ports 56 located at the bottom end of the probe.

The volume of the chamber in the probe must generally be much larger than that of the tube connecting the probe to the surface equipment. The larger size operates to scale down vertical fluid movement in the chamber in the tube resulting from pressure changes. If only a small tube were used, even a very small pressure change in the borehole would cause fluid to rise a considerable distance through the tubing toward the surface. Larger pressure changes would cause borehole fluids to be forced entirely through the borehole into the surface equipment. In a chamber of large volume, however, a change in pressure, although forcing upward the same volume of fluid as in the previous case, will cause a much smaller change in fluid level due to the much larger volume of the chamber. The volume of chamber required can be calculated from the following:

$$[\text{Volume of Chamber}] = \frac{[\text{Maximum pressure}] \times [\text{Volume of tube}]}{[\text{Minimum pressure}]} - [\text{Volume of tube}]$$

The ratio of the volume of chamber to the volume of the tube can thus be expressed as:

$$\frac{[\text{Maximum pressure}] - [\text{Minimum pressure}]}{\text{Minimum pressure}}$$

Test fluids supplied by the pressure source may be any of a various number of fluids of which nitrogen is one that has been found particularly suitable.

In the operation of the apparatus thus far described, the tube and chamber are filled with pressurized test fluid from pressure source 23. The point at which the tube or chamber are filled may be determined by monitoring the pressure of the test fluid with the pressure gauge 35. If the pressure of the test fluid is plotted versus time, a characteristic curve like that in FIG. 4 will be produced, if the tube and chamber are filled at a constant rate. The pressure will steadily increase from zero along portion 100 of the curve in FIG. 4 until it reaches a peak 102. At peak 102 the pressure of the test fluid will have become sufficiently large to begin displacing borehole fluid from chamber 29 in probe 27 (FIG. 2). After the test fluid has begun to displace the borehole fluid, the pressure will begin dropping in portion 104 of the characteristic curve. The volume occupied by the test fluid increases as a borehole fluid is displaced. After the borehole fluid has been totally displaced test fluid will begin itself escaping from points 44 to probe 27, and the pressure of the test fluid will not be able to change further. This is shown as portion 106 of the characteristic curve. Point 108 of the curve is a point at which chamber 29 is filled with the test fluid. The system is locked in at point 108, and thereafter changes in borehole pressure may be read directly from pressure gauge 35.

The microtubing utilized in the system of the invention exhibits anomalous flow behavior in comparison to larger tubes used in prior art devices. It has been found, for example, that the relationship between the elution time of a fluid through microtubing and the insertion pressure of the fluid is nonlinear and has a single minimum. In a tubing 1450 feet in length and 0.020 inches in diameter, for example, it was found that it required about 15 minutes for a pressure of less than 100 pounds to communicate from one end of the tube to the other. This time decreased rapidly with increasing pressure until a minimum of 6 minutes was required at 500 pounds. Above 500 pounds, the time again increased until 11 minutes was required at 6000 pounds. This upturn is believed to be caused by the cessation of laminar flow in the tube, a phenomenon not found in larger tubes under the same pressure conditions, and to microscopic imperfections in the tube's internal surface whose effects are neglegible in large tubes but increase with decreasing tube size until they are substantial in microtubes. Tests of longer lengths of tubing have shown that about 15 hours are required to fill a chamber of approximately 26 cubic inches through an 8000 foot tube 0.031 inches in diameter.

Microtubing of the size used herein thus presents an extremely high impedance to fluid flow. This resistance increases as the area of the tubing decreases; and area, of course, decreases as the square of the diameter.

This means that a tube 0.025 inches in diameter has only 1/100th the area of a tube 0.25 inches in diameter.

From the foregoing, it is clear that the flow rates involved can be spoken of more correctly in terms of molecules rather than volume. A valve found to be suitable to control such flow rates is the "Micro Control" metering valve manufactured by High Pressure Equipment Company, Inc. of Erie, Pennsylvania. The travel of stem 37 (FIG. 1) is 0.005 inches per revolution, and the flow coefficient ($C_v$) in the full open position is 0.04. $C_v$ is a measure of the friction that the valve provides to fluid flow. It is the ratio of the actual velocity of flow to the velocity of flow if the valve were frictionless. This means that the flow in the Micro Control Valve is at its maximum only 4 percent of what its ideal flow would be. In comparison, the $C_r$ of most orifices is generally well above 0.5.

Due to the extremely high impedance of the microtubing used in the present system, the pressure sensed at the bottom of the borehole in measuring probe 27 (FIG. 1) requires an extended length of time to reach pressure gauge 33. On the other hand, the relatively short length of tubing between pressure source 31 and pressure gauge 33 permits the source pressure to quickly reach the pressure gauge 33. If the pressure source is not isolated from the gauge, the source pressure rather than the downhole pressure will be measured during the time that the probe is being charged up to borehole pressure.

Valve 32 is used to remove the effects of source pressure from the pressure read by gauge 33. It does so by matching the impedance of the downhole tubing to that of the surface tubing between the gauge and the pressure source. In effect the surface tubing is made to look longer from the viewpoint of the gauge by decreasing its diameter. The principle involved is that a particular impedance can be obtained either by controlling the length of a tube or its diameter.

The micro flow rates in the system and the small size of the microtubing require that the valve 32 provide extremely precise flow control. The flow rates have been found to be so low that there are no flow meters presently available that will measure it. In addition, the valve required to control this minute flow can only be specified indirectly. The actual flow rates can vary widely from valve to valve of the same type and can change depending upon how it is used. For example, overtightening of the valve control 37 can change the size of orifice 36 radically.

The sensitivity required in matching the impedance may be illustrated by tests performed using the present system as illustrated in FIG. 1. It was found that a vernier setting on the Micro Control Valve of 1.5 allowed the fluid to enter the downhole tube too rapidly and thus influence pressure gauge 33. A setting of 1.15, however, was found to provide the proper impedance match. Since each revolution of the valve stem provides 0.005 inches of stem travel and the stem was rotated 0.35 turns, the total stem travel between proper and improper impedance matching was 0.00175 inches.

From the foregoing, it is clear that tubing of the size used has such different flow characteristics from tubes larger than, say, 0.006 inches that special techniques and apparatus are required for flow control.

While particular embodiments of the present invention have been shown and described, it is apparent that changes and modifications may be made without departing from the true spirit and scope of the invention. It is therefore the intention in the appended claims to cover all such changes and modifications.

What is claimed is:

1. In a borehole measuring system for detecting pressure variations in a borehole and transmitting detected pressure variations to the surface, microtubing extending from the surface to a point in the borehole at which pressure variations are to be detected, means at the surface for supplying a fluid to the microtubing, means at the surface for providing indications of fluid pressure in the microtubing, and micro flow means for isolating the pressure indication providing means from the supplying means, said micro flow means having a flow coefficient equal to or less than 0.04.

2. The apparatus of claim 1 wherein the micro flow means is a micro flow valve.

3. In a borehole pressure measuring system having microtubing extending from the surface to a point in the borehole where pressure is to be measured; surface detecting means comprising: means for supplying a fluid to the microtubing at selectable pressures; means for indicating the pressure in the microtubing; and micro flow means between the supplying means and the indicating means for controlling the flow of fluid into the microtubing, said micro flow means having a flow coefficient equal to or less than 0.04.

4. The surface detecting means of claim 3 wherein the micro flow means is a valve.

5. In a borehole pressure measuring system in which pump means at the surface supplies a fluid to microtubing that extends from the surface to a point in the borehole where pressure is to be measured, means for monitoring the pressure in the microtubing, comprising: a pressure gauge in communication with the microtubing; and a valve in the microtubing between the pressure gauge and the pump means, said valve having a coefficient of flow equal to or less than 0.04.

6. In a borehole pressure measuring system in which a fluid is supplied from the surface through microtubing to a downhole device and the resulting pressure in the downhole device is monitored at the surface through the microtubing, improved means for supplying the fluid comprising: a selectably variable pump; and a micro flow valve between the pump and the point at which the pressure in the downhole device is monitored.

7. A borehole pressure measuring system comprising: a microtube extending from the borehole opening to the point in the borehole where the pressure is to be measured; a chamber in fluid communication with the microtube; means connected to the microtube at the borehole opening for measuring pressure in said microtube; means for supplying a pressurized gas through said microtube to the chamber; and a microflow valve having a flow coefficient of less than 0.04 and connected between the measuring means and the supplying means, for restricting the gas flow from said supplying means and thereby permitting said measuring means to measure downhole pressure independent of the pressure of the gas in the supplying means.

8. A borehole pressure measuring system comprising: a microtube having an inside diameter of less than 0.060 inches and extending from the borehole opening to the point in the borehole where the pressure is to be measured; a chamber in fluid communication with the microtube; means connected to the microtube at the borehole opening for measuring pressure in said microtube; means for supplying a pressurized gas through said microtube to the chamber; and a microflow valve connected between the measuring means and the supplying means, for restricting the gas flow from said supplying means and thereby permitting said measuring means to measure downhole pressure independent of the pressure of the gas in the supplying means.

* * * * *